US006881254B2

(12) United States Patent
Akui et al.

(10) Patent No.: US 6,881,254 B2
(45) Date of Patent: Apr. 19, 2005

(54) COATING MATERIAL FOR INORGANIC-FILM FORMATION AND METHOD OF FORMING INORGANIC FILM FROM THE COATING MATERIAL

(75) Inventors: Jun Akui, Kanagawa-ken (JP); Hideo Kogure, Kanagawa-ken (JP); Osamu Isozaki, Kanagawa-ken (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 10/478,498

(22) PCT Filed: May 22, 2002

(86) PCT No.: PCT/JP02/04935

§ 371 (c)(1),
(2), (4) Date: Nov. 21, 2003

(87) PCT Pub. No.: WO02/094718

PCT Pub. Date: Nov. 28, 2002

(65) Prior Publication Data

US 2004/0149168 A1 Aug. 5, 2004

(30) Foreign Application Priority Data

May 22, 2001 (JP) ........................................ 2001-152446

(51) Int. Cl.[7] ...................... C01G 23/00; C01G 23/053; B32B 15/04
(52) U.S. Cl. .................. 106/287.19; 428/469; 428/470; 428/472; 428/472.1
(58) Field of Search ..................... 106/287.19; 428/469, 428/470, 472, 472.1

(56) References Cited

U.S. PATENT DOCUMENTS 3,984,299 A    10/1976  Jerabek 4,017,438 A        4/1977   Jerabek et al.
5,759,251 A    *   6/1998   Nakamura et al. ........ 106/286.4
6,538,194 B1   *   3/2003   Koyanagi et al. ............ 136/256
6,736,890 B2   *   5/2004   Haruta et al. ........... 106/287.19

FOREIGN PATENT DOCUMENTS

| EP | 1052225 | 1/1999 | |
| EP | 1405826 A1 * | 4/2004 | ........... C01G/23/00 |
| JP | 5118/67 | 3/1967 | |
| JP | 24192/67 | 11/1967 | |
| JP | 24194/67 | 11/1967 | |
| JP | 986/74 | 1/1974 | |
| JP | 15027/75 | 4/1974 | |
| JP | 33104/74 | 9/1974 | |
| JP | 29175/78 | 8/1978 | |
| JP | 43013/84 | 3/1984 | |
| JP | 35419/88 | 2/1988 | |
| JP | 220380/89 | 9/1989 | |
| JP | 224220/89 | 9/1989 | |
| JP | 504023/89 | 6/1993 | |
| JP | 71418/97 | 3/1997 | |
| JP | 10-067516 | 3/1998 | |
| JP | 67516/98 | 10/1998 | |
| JP | 2000/247638 | 9/2000 | |
| JP | 2000/247639 | 9/2000 | |
| JP | 2002-179949 | 6/2002 | |

* cited by examiner

*Primary Examiner*—David Brunsman
(74) *Attorney, Agent, or Firm*—Fisher, Christen & Sabol

(57) ABSTRACT

An inorganic film-forming coating composition prepared by adding a basic compound (B) to a titanium-containing water based solution (A) obtained by reacting a hydrogen peroxide water with at least one titanium compound selected from the group consisting of a hydrolizable titanium compound, a low condensation product of the hydrolizable titanium compound, titanium hydroxide and a low condensation product of the titanium hydroxide; and an inorganic film-forming method by use of the coating composition.

32 Claims, No Drawings

COATING MATERIAL FOR INORGANIC-FILM FORMATION AND METHOD OF FORMING INORGANIC FILM FROM THE COATING MATERIAL

This application is a 371 national state application of International (PCT) Application No. PCT/JP02/04935, filed on May 22, 2002, that has priority benefit of Japanese Patent Application No. 01/152,446, filed on May 22, 2001.

FIELD OF THE INVENTION

The present invention relates to a coating composition capable of forming a titanium oxide film showing good properties in photoactivity, antibacterial properties, hydrophilic properties, pollution resistance, hazeproofness, gas decomposition properties, deodorizing properties, water treatment properties, energy transformation properties, decoloring properties, heat resistance, corrosion resistance, gas barrier properties, etc. and a method of forming the inorganic film by use of the coating composition.

BACKGROUND ART

The titanium oxide film-forming methods known in the art may include, for example, (1) a method of coating a titanium oxide sol onto a substrate, followed by sintering, (2) a method of coating an aqueous solution of titanium chloride or titanium sulfate onto a substrate, followed by heat treating, (3) a plasma spray coating method which comprises fusing titanium oxide solid particles in the presence of plasma generated in atmosphere, followed by spraying onto a substrate, (4) a spatter spraying method of spattering the oxide as a target under vacuum, followed by spraying onto a substrate, (5) a chemical vapor deposition method of volatilizing an organic metal compound or the like, followed by decomposing in an electric furnace, and forming a film onto a substrate, (6) a sol-gel method of coating a sol obtained by hydrolysis of a metal alkoxide onto a substrate, followed by sintering, and the like.

However, the above methods (1) to (6) have such drawbacks that the method (1) is such that a film thickness of 0.1 μm or more may develop cracks and peelings, resulting in showing poor film-forming properties, and sintering at a temperature of hundreds is required, resulting in requiring much time and labor, the method (2) is such that adverse effects of thermal decomposition products on the substrate and necessity of sintering at a temperature of hundreds require much time and labor, the method (3) is unable to form a fine film and results poor adhesion properties, the methods (4) and (5) are such that a satisfactory film may be obtained under vacuum, so that a vacuumizing reactor may be required, and that a film-forming speed may be so low that heating the substrate at a temperature of hundreds to obtain a fine film, and the method (6) is such that the acid, alkali and organic compounds contained in the sol of the method (6) may produce problems of corrosion of a substrate, and that removal of the organic compounds requires heating at 400° C. or higher.

In addition to the above methods, the methods free of the step of sintering at high temperatures may include (7) a method of forming a titanium oxide film from an aqueous fluoride solution of titanium oxide and boric acid, (8) a method which comprises precipitating a titanium hydroxide gel from an aqueous solution of titanium chloride or titanium sulfate and an alkali solution such as ammonia, caustic soda and the like, followed by separating the titanium hydroxide gel by decantation, thoroughly washing with water, and adding hydrogen peroxide water (see Japanese Patent Application Laid-Open No. 71418/97), and the like.

However, the method (7) has such drawbacks that formation of the film requires much time, and handling of the fluoride is troublesome, and the method (8) has such drawbacks that the method (8) comprises complicated steps, removal of the alkali salt is troublesome, inclusion of other metals may make it difficult to obtain a high purity film, difficulty in control of pH results films different from each other depending on variation of pH, and so forth.

DISCLOSURE OF THE INVENTION

It is an object of the present invention to provide a coating composition suitable for use in forming an inorganic film, and free of byproducts such as alkali salt, fluoride and the like as in the prior art so as to show good properties in storage stability, film performances, etc.

It is another object of the present invention to provide a coating composition for use in forming an inorganic film, particularly a titanium oxide film and a method of forming an inorganic film, particularly a titanium oxide film, so that the titanium oxide film may be formed at such a low temperature that the resulting titanium oxide film may show characteristic film performances such as photoactivity, antibacterial properties, hydrophilic properties, pollution resistance, hazeproofness, gas decomposition properties, deodorizing properties, water treatment, energy transformation, decoloring properties, heat resistance, corrosion resistance, gas barrier properties, and the like.

That is, the present invention firstly provides an inorganic film-forming coating composition prepared by adding a basic compound (B) to a titanium-containing water based solution (A) obtained by reacting a hydrogen peroxide water with at least one titanium compound selected from the group consisting of a hydrolizable titanium compound, a low condensation product of the hydrolizable titanium compound, titanium hydroxide and a low condensation product of the titanium hydroxide.

The present invention secondly provides an inorganic film-forming coating composition prepared by adding a basic compound (B) to a titanium-containing water based solution $(A_1)$ obtained by reacting a hydrogen peroxide water in the presence of a titanium oxide sol with at least one titanium compound selected from the group consisting of a hydrolizable titanium compound and a low condensation product of the hydrolizable titanium compound.

The present invention thirdly provides an inorganic film-forming method which comprises coating the above coating compositions onto a substrate respectively, followed by optionally heat treating to form an inorganic film.

MOST PREFERABLE EMBODIMENTS OF THE INVENTION

The water based solution (A) used in the inorganic film-forming coating composition of the present invention is a titanium-containing water based solution obtained by reacting a hydrogen peroxide water with at least one titanium compound selected from the group consisting of a hydrolizable titanium compound, a low condensation product of the hydrolizable titanium compound, titanium hydroxide and a low condensation product of the titanium hydroxide. The above water based solution may include any ones known in the art.

The hydrolizable titanium compound is a titanium compound which has a hydrolizable group bonded directly to titanium, and which reacts with moisture such as water, steam and the like to form titanium hydroxide.

The groups to be bonded to titanium in the hydrolizable titanium compound is such that all of the groups may be a hydrolizable group, or a part of the groups may be a hydrolyzed hydroxyl group.

The hydrolizable group may include any groups which react with moisture to form titanium hydroxide without particular limitations, for example, lower alkoxyl, a group to form a salt with titanium, for example, halogen atom such as chlorine, hydrogen atom, sulfate ion, and the like.

The hydrolizable titanium compound containing the lower alkoxyl group as the hydrolizable group may preferably include tetraalkoxytitanium represented by the general formula: $Ti(OR)_4$, wherein R is same or different, and is an alkyl group having 1 to 5 carbon atoms. The alkyl group having 1 to 5 carbon atoms may include, for example, methyl group, ethyl group, n-propyl group, isopropyl group, n-butyl group, sec-butyl group, tert-butyl group, and the like.

The hydrolizable titanium compound having a group to form a salt with titanium as the hydrolizable group may include titanium chloride, titanium sulfate and the like.

The low condensation product of the hydrolizable titanium compound is a low condensation product between the hydrolizable titanium compounds. The groups to be bonded to titanium in the above low condensation product is such that all of the groups may be a hydrolizable group, or a part of the groups may be a hydrolyzed hydroxyl group.

The above low condensation product may also include orthotitanic acid or titanium hydroxide gel obtained by hydrolysis reaction of an aqueous solution of the hydrolizable titanium compound having a hydrolizable group such as chlorine atom and sulfate group, for example, titanium chloride, titanium sulfate, and the like with an alkali solution of ammonia, caustic soda, etc.

The hydrolizable titanium low condensation product and the titanium hydroxide low condensation product have a degree of condensation in the range of 2 to 30, preferably 2 to 10.

The water based solution (A) may include a titanium-containing water based solution obtained by reacting the above titanium compound with hydrogen peroxide water and known in the art without particular limitations.

Specific examples of the water based solution (A) may include ① an aqueous solution of a titanyl ion-hydrogen peroxide complex or titanic acid, i.e. peroxotitanium hydrate obtained by adding hydrogen peroxide water to a gel or sol of a water-containing titanium oxide (see Japanese Patent Application Laid-Open Nos. 35419/88 and 224220/89); ② a titania film-forming liquid prepared by reacting a titanium hydroxide gel obtained by the reaction of an aqueous solution of titanium chloride or titanium sulfate with a basic solution (see Japanese Patent Appliction Laid-Open Nos. 71418/97 and 67516/98).

In the above titania film-forming liquid, an aqueous solution of titanium chloride or titanium sulfate having a group to form a salt with titanium is reacted with an alkali solution of ammonia, caustic soda or the like to form precipitates of titanium hydroxide gel as orthotitanic acid, followed by separating the titanium hydroxide gel by decantation using water, sufficiently washing with water, further adding hydrogen peroxide water, and removing remaining hydrogen peroxide to obtain an yellow transparent viscous liquid.

The precipitated orthotitanic acid is polymerized and in a gel state due to polymerization between OH group and hydrogen bonding, and is impossible to be used as a titanium-containing water based solution as it is. Addition of hydrogen peroxide water to the above gel results that a part of OH groups becomes a peroxide state so as to be dissolved as peroxotitaniate ion, or that a high molecular chain may be broken down to a low molecule so as to be a sol state and the remaining hydrogen peroxide is decomposed to water and oxygen so as to be used as an inorganic film-forming titanium-containing water based solution.

Since the above sol contains only oxygen atom and hydrogen atom besides titanium atom, conversion to titanium oxide by drying or calcining produces only water and oxygen, resulting in making it unnecessary to remove a carbon component and halogen component as required in the sol-gel method and in the thermal decomposition of a sulfate, etc., and in obtaining a relatively high density crystalline titanium oxide film at a temperature lower than in the art.

Another specific example of the water based solution (A) may include ③ a titanium oxide-forming liquid obtained by a process which comprises adding hydrogen peroxide to an aqueous solution of an inorganic titanium compound such as titanium chloride and titanium sulfate to form a peroxotitanium hydrate, adding a basic substance to form a solution, leaving to stand or heating to form precipitates of a peroxotitanium hydrate polymer, removing a dissolved component other than water derived from at least a titanium-containing starting material solution, and reacting hydrogen peroxide (see Japanese Patent Application Laid-Open Nos. 2000-247638 and 2000-247639).

The water based solution (A) used in the present invention preferably includes ones prepared by adding the titanium compound to the hydrogen peroxide water. The titanium compound may preferably include the hydrolizable titanium compound having a group hydrolyzed to form hydroxyl group as represented by the above general formula and a low condensation product of the hydrolizable titanium compound.

A mixing ratio of the hydrolizable titanium compound and/or the low condensation product thereof (hereinafter may be referred to as a hydrolizable titanium compound (a)) containing the group hydrolyzed to form hydroxyl group to the hydrogen peroxide water is in the range of 0.1 to 100 parts by weight, particularly 1 to 20 parts by weight as hydrogen peroxide per 10 parts by weight of the hydrolizable titanium compound (a). An amount less than 0.1 part by weight of the hydrogen peroxide results incomplete formation of a chelate compound, resulting in developing hazes and precipitates. On the other hand, when more than 100 parts by weight, unreacted hydrogen peroxide may remain so that a dangerous active oxygen may be discharged during storage.

A hydrogen peroxide content in the hydrogen peroxide water may not particularly be limited, but preferably be in the range of 3 to 30% by weight from the standpoints of easiness of handling and a solid content of the resulting solution regarding to coating workability.

The water based solution (A) obtained by use of the hydrolizable titanium compound (a) may be prepared by reacting the hydrolizable titanium compound (a) with the hydrogen peroxide water at a reaction temperature in the range of 1 to 70° C. for 10 minutes to 20 hours.

The water based solution (A) obtained by use of the hydrolizable titanium compound (a) may be obtained in such a manner that the reaction of the hydrolizable titanium compound (a) with the hydrogen peroxide water results hydrolysis of the hydrolizable titanium compound (a) to form a hydroxyl group-containing titanium compound, followed by coordinating the hydroxyl group-containing titanium compound with hydrogen peroxide, wherein the hydrolysis reaction and the coordination may be almost simultaneously take place, to form a chelate solution showing high stability at room temperature and a long term storage stability. On the other hand, a titanium hydroxide gel used in the preparation of the titanium oxide film in the art is partly three dimensionalized through a Ti—O—Ti linkage, and is essentially different from the above reaction product of the hydroxyl group-containing titanium compound with the hydrogen peroxide water in composition and stability.

The water based solution (A) obtained by use of the hydrolizable titanium compound (a) may be heat treated, or autoclaved at 80° C. or higher to obtain a titanium oxide dispersion containing ultrafine particles of crystallized titanium oxide. When lower than 80° C., crystallization of titanium oxide may not satisfactorily proceed. The above titanium oxide dispersion is such that the ultrafine particles of crystallized titanium-oxide have a particle size in the range of 10 nm or less, preferably 1 nm to 6 nm. The above dispersion shows a translucent appearance. A particle size more than 10 nm may reduce film-forming properties, particularly a particle size of 1 µm or more may develop cracks. The above titanium oxide dispersion may also be used as the water based solution (A).

The water based solution (A) obtained by use of the hydrolizable titanium compound (a), as it is, may be coated onto a steel sheet material, followed by drying or heat treating at a low temperature to form a fine titanium oxide film showing good adhesion properties.

A heat treating temperature to form the titanium oxide film is 200° C. or lower, preferably 150° C. or lower.

The water based solution (A) obtained by use of the hydrolizable titanium compound (a) may form an amorphous titanium oxide film containing some amount of hydroxyl group by heat treating at the above temperatures.

Coating only of the titanium oxide dispersion obtained by the heat treatment at 80° C. or higher makes it possible to form a crystalline titanium oxide film so as to be useful as a coating composition for use in a substrate incapable of heat treating.

The titanium-containing water based solution ($A_1$) used in the inorganic film-forming coating composition of the present invention is obtained by reacting a hydrogen peroxide water in the presence of a titanium oxide sol with a hydrolizable titanium compound and/or a low condensation product thereof (hereinafter referred to as a hydrolizable titanium compound (a)). The hydrolizable titanium compound (a) may preferably include a titanium monomer containing a group hydrolyzed to form hydroxyl group as represented by the above general formula and a low condensation product of the hydrolizable titanium compound.

The titanium oxide sol is a sol prepared by dispersing fine particles of an amorphous titania and anatase titania into water, optionally containing a water-soluble organic solvent such as alcohols, alcohol ethers, and the like. The titanium oxide sol may include ones known in the art. The titanium oxide sol may include an amorphous titania sol prepared by dispersing into water a titanium oxide agglomerate such as ① ones obtained by subjecting a titanium-containing solution of titanium sulfate and titanyl sulfate to hydrolysis, ② ones obtained by subjecting an organotitanium compound such as titanium alkoxide and the like to hydrolysis, ③ ones obtained by subjecting a solution of titanium halide such as titanium tetrachloride to hydrolysis or neutralization; and ones prepared by dispersing into water anatase titanium fine particles obtained by calcining the above titanium agglomerate. Calcination of the amorphous titania at the crystallizing temperature or higher, for example, 400° C. or higher, preferably 500° C. or higher makes it possible to convert the amorphous titania to the anatase titania. Examples of the water based titanium oxide sol may include TKS-201 (Trade name, marketed by Tayka Corporation, anatase crystal form, mean particle size 6 nm), TA-15 (Trade name, marketed by Nissan Chemical Industries, Ltd. anatase crystal form), STS-11 (Trade name, marketed by Ishihara Sangyo Kaisha Ltd., anatase crystal form), and the like.

On reacting the hydrolizable titanium compound (a) with the hydrogen peroxide water, a weight ratio of the titanium oxide sol to the reaction product is in the range of 1/99 to 99/1, preferably 10/90 to 90/10. A weight ratio less than 1/99 makes it impossible to provide an effect due to the addition of the titanium oxide sol in stability, photoreactivity, etc. A weight ratio more than 99/1 results poor film-forming properties.

A mixing ratio of the hydrolizable titanium compound (a) to the hydrogen peroxide water is in the range of 0.1 to 100 parts by weight, particularly 1 to 20 parts by weight as hydrogen peroxide per 10 parts by weight of the hydrolizable titanium compound (a). An amount less than 0.1 part by weight of the hydrogen peroxide results incomplete formation of a chelate compound, resulting in developing hazes and precipitates. On the other hand, when more than 100 parts by weight, unreacted hydrogen peroxide may remain so that a dangerous active oxygen may be discharged during storage.

A hydrogen peroxide content in the hydrogen peroxide water may not particularly be limited, but preferably be in the range of 3 to 30% by weight from the standpoints of easiness of handling and a solid content of the resulting solution regarding to coating workability.

The water based solution ($A_1$) may be obtained by reacting the hydrolizable titanium compound (a) with hydrogen peroxide water in the presence of the titanium oxide sol at 1 to 70° C. for 10 minutes to 20 hours.

The water based solution ($A_1$) is such that the reaction of the hydrolizable titanium compound (a) with the hydrogen peroxide water results hydrolysis of the hydrolizable titanium compound (a) to form a hydroxyl group-containing titanium compound, followed by coordinating the hydroxyl group-containing titanium compound with hydrogen peroxide, wherein the hydrolysis reaction and the coordination may be almost simultaneously take place, to form a chelate solution showing high stability at room temperature and a long term storage stability. On the other hand, a titanium hydroxide gel used in the preparation of the titanium oxide film in the art is partly three dimensionalized through a Ti—O—Ti linkage, and is essentially different from the above reaction product of the hydroxyl group-containing titanium compound with the hydrogen peroxide water in composition and stability. The use of the titanium oxide sol may prevent thickening due to a partial condensation reaction on synthesis. Adsorption of the condensation reaction product onto the surface of the titanium oxide sol may prevent polymerization in a solution state.

The titanium-containing water based solution ($A_1$) may be heat treated, or autoclaved at 80° C. or higher to obtain a titanium oxide dispersion containing ultrafine particles of crystallized titanium oxide. When lower than 80° C., crystallization of titanium oxide may not satisfactorily proceed. The above titanium oxide dispersion is such that the ultrafine particles of crystallized titanium oxide have a particle size in the range of 10 nm or less, preferably 1 nm to 6 nm. The above dispersion shows a translucent appearance. A particle size more than 10 nm may reduce film-forming properties, particularly a particle size of 1 μm or more may develop cracks. The above titanium oxide dispersion may also be used as the water based solution ($A_1$).

The titanium-containing water based solution ($A_1$), as it is, may be coated onto a steel sheet material, followed by drying or heat treating at a low temperature to form a fine titanium oxide film showing good adhesion properties.

A heat treating temperature to form the titanium oxide film is 200° C. or lower, preferably 150° C. or lower.

The water based solution (A) obtained by use of the hydrolizable titanium compound (a) may form an amorphous titanium oxide film containing some amount of hydroxyl group by heat treating at the above temperatures.

The titanium-containing water based solution (A), particularly the water based solution (A) prepared by use of the hydrolizable titanium compound (a) and the water based solution ($A_1$) preferably have improved properties in storage stability, corrosion resistance, etc.

The titanium-containing water based solutions (A) and ($A_1$) may optionally contain additives such as other pigments, sols, etc. Examples of the additive may include as commercially available, titanium oxide sol, titanium oxide powder, mica, talc, silica, baryta, clay, etc.

The basic compound (B) added to the titanium-con ining water based solutions (A) and ($A_1$) may include a neutralizable basic compound having a boiling point of 300° C. or lower, and preferably may include, particularly a water-soluble ones, for example, ammonia, dimethylethanolamine, 2-amino-2-methyl-1-propanol, triethylamine, morpholine, pyridine, triethanolamine, and the like.

A mixing amount of the basic compound (B) is in the range of 0.001 to 10 parts by weight, preferably 0.005 to 5 parts by weight per 100 parts by weight of the titanium-containing water based solution (A) or ($A_1$) as the solid content. A basic compound (C) less than 0.001 part by weight may reduce the storage stability of the solution. A basic compound (B) more than 10 parts by weight may increase an amount of the basic compound (B) remaining in a coating film formed therefrom, resulting in reducing film-forming properties, gas barrier properties, corrosion resistance and the like.

An inorganic film-forming coating composition having a pH of 2 or less may show poor storage stability. In the case where the pH is 7 or more, formation of precipitates may reduce film-forming properties.

The inorganic film-forming coating composition of the present invention optionally further contain a water based organic high-molecular compound (C).

The water based organic high-molecular compound (C) may include such ones that the organic high-molecular compound (C) per se is stable in the form of an aqueous solution without developing drawbacks such as agglomeration and sedimentation, thickening and gelling of an organic resin component dissolved or dispersed in water at a pH of 7 or less.

The water based high-molecular compound (C) may include water-soluble, water-dispersible and emulsifiable ones. A method of dissolving, dispersing or emulsifying an organic high-molecular compound into water may include any method known in the art, specifically may include ones containing a water-soluble or water-dispersible group such as hydroxyl group, carboxyl group, amino group, imino group, sulfide group, phosphime group and the like as an organic high-molecular compound per se, ones obtained by neutralizing at least part of the above functional group with an amine compound such as ethanolamine, triethylamine and the like, ammonia water, alkali metal hydroxide such as lithium hydroxide, sodium hydroxide, potassium hydroxide and the like in the case of an acid resin such as a carboxyl group-containing resin and the like, and ones obtained by neutralizing at least part of the above functional groups with a fatty acid such as acetic acid, lactic acid and the like, a mineral acid such as phosphoric acid and the like in the case of a basic resin such as an amino group-containing resin.

The water based organic high-molecular compound (C) may include, for example, epoxy based resin, phenol based resin, acrylic based resin, urethane based resin, olefin-carboxylic acid based resin, nylon based resin, a resin having a polyoxyalkylene chain, polyvinyl alcohol, polyglycerin, carboxymethylcellulose, hydroxymethylcellulose, hydrohyethocellulose and the like.

The above epoxy based resin may preferably include a cationic epoxy resin prepared by adding an amine to epoxy resin; modified epoxy resin such as acrylic-modified epoxy resin, urethane-modified epoxy resin and the like. The cationic epoxy resin may include (1) adducts of an epoxy compound with primary mono or polyamine, secondary mono or polyamine, primary and secondary mixed polyamine or the like (see U.S. Pat. No. 3,984,299 Specification); (2) adducts of an epoxy compound with a ketiminized, primary amino group-containing mono or polyamine (see U.S. Pat. No. 4,017,438 Specification); (3) reaction products obtained by etherification between an epoxy compound and a ketiminized, primary amino group-containing hydroxyl compound (see Japanese Patent Application Laid-Open No. 43013/84) and the like.

The above epoxy compound has a number average molecular weight in the range of 400 to 4000 particularly 800 to 2,000, and may be prepared by a reaction between a polyphenol compound and epichlorohydrin. Examples of the polyphenol compound may include bis (4-hydroxyphenyl) 2,2-propane, 4,4-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis (2-hydroxynaphthyl)methane, 1,5-dihydroxynaphthalene, bis(2,4-dihydroxyphenyl)methane, tetra(4-hydroxyphenyl)-1,1,2,2-ethane, 4,4-dihydroxydiphenylsulfone, phenol novolak, cresol novolak, and the like.

The above phenol based resin may include ones prepared by dissolving in water a high-molecular compound obtained by heating a phenol component and formaldehydes in the presence of a reaction catalyst for addition·condensation reaction. The phenol component as a starting material may include bifunctional phenol compound, trifunctional phenol compound, tetra or higher phenol compound and the like, for example, the bifunctional phenol compound such as 0-cresol, p-cresol, p-tert-butylphenol, p-ethylphenol, 2,3-xylenol, 2,5-xylenol and the like; trifunctional phenol compound such as phenol, m-cresol, m-ethylphenol, 3,5-xylenol, m-methoxyphenol and the like, and tetrafunctional phenol compound such as bisphenol A, bisphenol F and the like. These phenol compounds may be used alone or in combination.

The above acrylic based resin may include, for example, homopolymers or copolymers of acrylic monomers having a hydrophilic group such as carboxyl group, amino group, hydroxyl group and the like, and copolymers of acrylic monomers having the hydrophilic group with other copolymerizable monomers. These are subjected to emulsion polymerization, suspension polymerization or solution polymerization, followed by optionally neutralizing to obtain a water based acrylic resin or modified acrylic resin.

Examples of the carboxyl group-containing monomer may include acrylic acid, methacrylic acid, maleic acid, unhydrous maleic acid, crotonic acid, itaconic acid and the like.

A nitrogen-containing monomer may include a nitrogen-containing alkyl (meth)acrylate such as N,N-dimethylaminoethyl (meth)acrylate, N,N-diethylaminoethyl (meth)acrylate, N-t-butylaminoethyl (meth)acrylate and the like; a polymerizable amides such as acrylamide, methacrylamide, N-methyl (meth)acrylamide, N-methoxymethyl (meth)acrylamide, N-butoxymethyl (meth)acrylamide, N, N-dimethyl (meth)acrylamide, N, N-dimethylaminopropyl (meth)acrylamide, N, N-dimethylaminoethyl (meth)acrylamide and the like; aromatic nitrogen-containing monomer such as 2-vinylpyridine, 1-vinyl-2-pyrrolidone, 4-vinylpyridine and the like; allylamine and the like.

A hydroxyl group-containing monomer may include monoesterified product between polyhydric alcohol and acrylic acid or methacrylic acid, for example, 2-hydroxyethyl (meth)acrylate, hydroxypropyl (meth)acrylate, 2,3-dihydroxybutyl (meth)acrylate, 4-hydroxybutyl (meth)acrylate, polyethylene glycol mono (meth)acrylate and the like; a compound obtained by ring opening polymerization of ε-caprolactone with the monoesterified product between the polyhydric alcohol and acrylic acid or methacrylic acid, and the like.

Other monomers may include $C_{1-24}$ alkyl (meth)acrylate such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, 2-ethylhexyl acrylate, n-octyl (meth)acrylate, lauryl (meth)acrylate, tridecyl (meth)acrylate, octadecyl (meth) acrylate, isostearyl (meth)acrylate and the like; styrene, vinyl acetate and the like. These compounds may be used alone or in combination. The above "(meth)acrylate" means "acrylate or methacrylate" and so forth.

The above urethane based resin may include resins known in the art, for example, ones prepared by chain-lengthening a polyurethane obtained from diisocyanate and polyol such as polyester polyol, polyether polyol and the like optionally in the presence of a chain-lengthening agent as a low molecular weight compound having at least 2 active hydrogens, for example, diol, diamine and the like, followed by stably dispersing or dissolving into water (see Japanese Patent Publication Nos. 24192/67, 24194/67, 5118/67, 986/74, 33104/74, 15027/75, 29175/78). The polyurethane resin may stably be dispersed or dissolved into water by the following methods: ① a method of introducing an ionic group such as hydroxyl group, amino group, carboxyl group and the like to a side chain or molecular terminal of the polyurethane polymer to impart hydropholic properties, followed by dispersing or dissolving into water by selfemulsifying; ② a method of forcedly dispersing into water a completely reacted polyurethane polymer or a blocked polyurethane polymer obtained by blocking a terminal isocyanate group with a blocking agent such as oxime, alcohol, phenol, mercaptan, amine, sodium bisulfite and the like by means of an emulsifying agent and a mechanical shearing force, and a method of mixing an urethane polymer having a terminal isocyanate group with a mixture of water, emulsifying agent and chain-lengthening agent, followed by simultaneously dispersing and polymerizing by means of a mechanical shearing force; and ③ a method of forming a water-soluble polyurethane by use of a water-soluble polyol such as polyethylene glycol as polyol, that is, a main starting material of polyurethane, followed by dispersing or dissolving into water.

The above polyurethane based resin may include mixtures obtained by the above respective methods.

Diisocyanate used in the preparation of the polyurethane based resin may include aromatic, alicyclic and aliphatic diisocyanates, specifically hexamethylene diisocyanate, tetramethylene diisocyanate, 3, 3'-dimethoxy-4, 4'-biphenylene diisocyanate, p-xylylenediisocyanate, m-xylylenediisocyanate, 1, 3-(diisocyanatomethyl)-cyclohexanone, 1, 4-(diisocyanatomethyl)-cyclohexanone, 4, 4'-diisocyanatocyclohexane, 4, 4'-methylene bis (cyclohexylisocyanate), isophoronediisocyanate, 2, 4-tolylene diisocyanate, 2, 6-tolylenediisocyanate, p-phenylene diisocyanate, diphenylmethane diisocyanate, m-phenylene-diisocyanate, 2, 4-naphthalenediisocyanate, 3,3'-dimethyl-4,4'-biphenylene diisocyanate, 4,4'-biphenylene diisocyanate and the like. Of these, 2,4-tolylenediisocyanate, 2,6-tolylenediisocyanate, hexamethylenediisocyanate, and isophoronediisocyanate are particularly preferable.

Examples of commercially available polyurethane based resin may include Hydran HW-330, HW-340 and HW-350 (trade names, marketed by Dainippon Ink and Chemicals, Inc. respectively), Superflex 100, 150 and F-3438D (trade names, marketed by Dai-ichi Kogyo Seiyaku Co., Ltd. respectively), and the like.

The above polyvinyl alcohol resin may include polyvinyl alcohol having a degree of saponification of 87% or more, particularly 98% or more, i.e. completely saponified polyvinyl alcohol, and has a number average molecular weight in the range of 3,000 to 100,000.

The polyoxyalkylene chain-containing resin may include, for example, ones having polyoxyethylene chain or polyoxypropylene chain such as polyethylene glycol and polypropylene glycol, and may also include blocked polyoxyalkylene glycol bonded the polyoxyethylene chain with the polyoxypropylene chain in a block state.

The olefin-carboxylic acid based resin may include at least one water-dispersible or water-soluble resin selected from ① copolymer of olefin such as ethylene, propylene and the like with polymerizable unsaturated carboxylic acid, and ② a resin prepared by adding a polymerizable unsaturated compound to a dispersion of the above copolymer for emulsion polymerization, followed by interparticle crosslinking.

The copolymer ① is at least one copolymer of olefin with unsaturated carboxylic acid such as (meth)acrylic acid, maleic acid and the like. The copolymer ① is such that an unsaturated carboxylic acid content is in the range of 3 to 60% by weight, preferably 5 to 40% by weight, and that an acid group in the copolymer is neutralized with a basic substance to be water-dispersible.

The resin ② is a crosslinked resin prepared by adding the polymerizable unsaturated compound to the water dispersion of the copolymer ① for emulsion polymerization, followed by interparticle crosslinking. The polymerizable unsaturated compound may include vinyl monomers exemplified in the water-dispersible or water-soluble acrylic based resin. These monomers may be used alone or in combination.

A mixing amount of the water based organic high-molecular compound (C) is in the range of 10 to 2,000 parts by weight, particularly 100 to 1,000 parts by weight per 100 parts by weight as a solid content of the tibanium-containing water based solution (A) or ($A_1$) from the standpoints of stability of the solution, corrosion resistance, etc.

A titanium based coating composition in the present invention forms a stable solution in a neutral or acid region, particularly a pH of 1 to 10, preferably 1 to 7.

In addition to the above components, the titanium based coating composition may contain a thickening agent, surface active agent, antibacterial agent, anticorrosive agent such as tannic acid, phytic acid, benzotriazole and the like, pigments such as color pigment, extender pigment, anticorrosive pigment and the like, and the like.

The titanium based coating composition may optionally be used by diluting with a hydrophilic solvent such as methanol, ethanol, isopropyl alcohol, ethylene glycols, propylene glycols and the like.

The titanium based coating composition in the present invention may be coated onto a substrate, optionally followed by heat treating to form a titanium based anticorrosive coating film.

The inorganic film-forming coating composition in the present invention may be coated onto a substrate, followed by drying or heat treating at a low temperature to form a fine titanium oxide film showing good adhesion properties. A titanium oxide film may be formed at a low temperature, but a heat treating temperature of 200° C. or higher is preferable for the purpose of improving adhesion properties. One coating makes it possible to form a titanium oxide film having a thickness of 1 $\mu$m or more, and showing good adhesion properties without being separated, but the film thickness is usually in the range of 0.001 to 20 $\mu$m, particularly 0.1 to 15 $\mu$m.

The inorganic film-forming coating composition in the present invention is such that a heat treatment at a temperature lower than 200° C. forms an amorphous titanium oxide film containing some hydroxyl group, whereas when 200° C. or higher, a fine crystalline titanium oxide film is formed.

Coating only of the titanium oxide dispersion obtained by the heat treatment at 80° C. or higher makes it possible to form a crystalline titanium oxide film so as to be useful as a coating composition for use in a substrate incapable of heat treating, resulting in being applicable to various uses as above described and in making it possible to form a film having a relatively high density and showing good adhesion properties at low temperatures.

The above film prepared by drying only may show water resistance and impregnating properties so as to be impregnated with a solution of other compound, resulting in that the following heat treatment makes it possible to form such a composite material that the other compound may be deposited or dispersed into the titanium oxide film. The other compound may include, for example, other metal compounds.

Other pigments and sols may be added and dispersed into the inorganic film-forming coating composition. Other pigments and sols to be added may include, for example, known titanium oxide sols, titanium oxide powder, etc.

The substrate used in the present invention may include any materials resistant to heat treatment depending on uses, for example, metal, pottery, plastics, fiber, glass, concrete and the like, and may also include the interior surface of a porous material, the surface of a powder to be treated.

Many titanium oxide films obtained in the present invention may show activity on photo-irradiation. For example, photooxidation of nitrogen oxide, etc. may result nitric acid.

In the present invention, in the case where the titanium oxide film is applied to an energy transformation material, the titanium oxide film may preferably be coated with a sensitizing dye. The sensitizing dye may include ones having an absorption characteristics in the visible light region and/or infrared light region, and at least one of various kinds of metal complexes and organic dyes. The sensitizing dye may preferably include ones having a functional group such as carboxyl group, hydroxyalkyl group, hydroxyl group, sulfone group and carboxyalkyl group in the molecule because of quick adsorption onto a semiconductor. The above metal complex is preferable because of improvements in a spectral sensitization and durability. The metal complex may include a metal phthalocyanine such as copper phthalocyanine, titanyl phthalocyanine and the like, chlorophyll, hemin, complexes of ruthenium, osmium, iron and zine as disclosed in Japanese Patent Application Laid-Open No. 220380/89 and Japanese Patent Application Publication No. 504023/93. An organic dye may include a metal-free phthalocyanine, cyanine red dye, merocyanine based dye, xanthene based dye, and triphenylmethane dye. The cyanine based dye may include NK1194 and NK3422 (trade names, marketed by Hayashibara Biochemical Laboratories, Inc. respectively).

Specific examples of the merocyanine based dye may include NK2426 and NK2501 (trade names, marketed by Hayashibara Biochemical Laboratories, Inc. respectively). Specific examples of the xanthene based dye may include uranine, Eosine, rose bengal, Rhodamine B, and dibromofluorescein. Specific examples of triphenylmethane dye may include malachite green and crystal violet.

The titanium oxide film obtained in the present invention shows, in addition to photoactivity, good properties in heat resistance, corrosion resistance and gas barrier properties, and may be used as a heat resistant and corrosion resistant film.

Taking advantage of photo-activity of the titanium oxide film, the film may be applicable to various fields such as decomposition and removal of environmental pollutants in air and water, hydrophilizing treatment, antibacterial treatment, deodorizing treatment, hazeproof treatment, water treatment, energy transformation and the like.

EXAMPLE

The present invention is explained more in detail by the following Examples and Comparative Examples, in which "part" and "%" mean "part by weight" and "% by weight" respectively, and should not be limited to Examples.

Preparation Example 1

(Preparation of Inorganic Film-Forming Composition 1)

A solution was prepared by diluting 5 parts of 60% titanium tetrachloride solution with distilled water to 500 parts, followed by dropping an ammonia water (1:9) to form titanium oxide precipitates, washing with distilled water, adding 10 parts of 30% hydrogen peroxide solution and mixing to obtain 70 parts of a titanium-containing yellow translucent viscous water based solution, and adding with agitation 0.02 part of 25% ammonia water to obtain an inorganic film-forming coating composition (1).

Preparation Example 2
(Preparation of Inorganic Film-Forming Coating Composition 2)

A mixture of 10 parts of tetra-iso-propoxytitanium and 10 parts of iso-propanol was dropped with agitation at 20° C. for one hour into a mixture of 10 parts of 30% hydrogen peroxide water and 100 parts of deionized water, followed by aging at 25° C. for 2 hours to obtain a yellow transparent slight by viscous titanium-containing water based solution, and adding with agitation 0.2 part of 25% ammonia water to obtain an inorganic film-forming coating composition (2).

Preparation Example 3
(Preparation of Inorganic Film-Forming Coating Composition 3)

To the titanium-containing water based solution in Preparation Example 2 was added with agitation 0.4 part of dimethylethanolamine to obtain an inorganic film-forming coating composition (3).

Preparation Example 4
(Preparation of Inorganic Film-Forming Coating Composition 4)

To the titanium-containing water based solution in Preparation Example 2 was added with agitation 0.2 part of 2-amino-2-methyl-1-propanol to obtain an inorganic film-forming coating composition (4).

Preparation Example 5
(Preparation of Inorganic Film-Forming Coating Composition 5)

To the titanium-containing water based solution in Preparation Example 2 was added with agitation 0.4 part of triethylamine to obtain an inorganic film-forming coating composition (5).

Preparation Example 6
(Preparation of Inorganic Film-Forming Coating Composition 6)

The titanium-containing water based solution in Preparation Example 2 was heat treated at 95° C. for 6 hours to obtain a white yellow translucent titanium-containing water based solution, followed by adding with agitation 0.2 part of 25% ammonia water to obtain an inorganic film-forming coating composition (6).

Preparation Example 7
(Preparation of Inorganic Film-Forming Coating Composition 7)

A mixture of 10 parts of tetra-iso-propoxytitanium and 10 parts of iso-propanol was dropped with agitation at 10° C. for one hour into a mixture of 5 parts (as solid content) of TKS-201 (trade name, marketed by Tayka Corporation, titanium oxide sol), 10 parts of 30% hydrogen peroxide water and 100 parts of deionized water, followed by aging at 10° C. for 24 hours to obtain a yellow transparent slightly viscous titanium-containing water based solution, and adding with agitation 0.2 part of 25% ammonia water to obtain an inorganic film-forming coating composition (7).

Preparation Example 8 (For Comparison)
(Preparation of Inorganic Film-Forming Coating Composition 8)

A mixture of 10 parts of tetra-iso-propoxytitanium and 10 parts of iso-propanol was dropped with agitation at 20° C. for one hour into a mixture of 10 parts of 30% hydrogen peroxide water and 100 parts of deionized water, followed by aging at 25° C. for 2 hours to obtain a yellow transparent slightly viscous titanium-containing water based solution (an inorganic film-forming coating composition 8).

Preparation Example 9 (For Comparison)
(Preparation of Inorganic Film-Forming Coating Composition 9)

Titanium hydroxide was dispersed into water so as to obtain a liquid of 0.2 mol/l.

Examples 1–7 and Comparative Examples 1–2

The inorganic film-forming coating compositions of Preparation Examples 1–5, the viscous liquid of Preparation Example 8 and the dispersion of Preparation Example 9 were coated onto a glass plate so as to be a dry film thickness of 1.0 μm by a bar coater, followed by heat curing at 200° C. for 30 minutes to prepare coating test panels respectively.

The above coating compositions were subjected to storage stability test (1), and the coating test panels were subjected to film appearance (2), adhesion properties (3), pencil hardness (4), water resistance (5), and wettability or contact angle to water test (6) respectively. Results are shown in Table 1.

TABLE 1

|  | Preparation Examples | Storage stability | Film appearance | Adhesion properties | Pencil hardness | Water resistance | Contact angle to water |
| --- | --- | --- | --- | --- | --- | --- | --- |
| Example 1 | 1 | No changes | Good | 100 | 3H | Nothing changed (good) | 10° or less |
| Example 2 | 2 | No changes | Good | 100 | 3H | Nothing changed (good) | 10° or less |
| Example 3 | 3 | No changes | Good | 100 | 3H | Nothing changed (good) | 10° or less |
| Example 4 | 4 | No changes | Good | 100 | 3H | Nothing changed (good) | 10° or less |
| Example 5 | 5 | No changes | Good | 100 | 3H | Nothing changed (good) | 10° or less |
| Example 6 | 6 | No changes | Hazy | 100 | 2H | Slight local rust | 5° or less |

TABLE 1-continued

| Preparation Examples | Storage stability | Film appearance | Adhesion properties | Pencil hardness | Water resistance | Contact angle to water |
|---|---|---|---|---|---|---|
| Example 7 | 7 | No changes | Hazy | 100 | 2H | Slight local rust | 5° or less |
| Comparative Example 1 | 8 | Slight thickening | Good | 100 | 3H | Nothing changed (good) | 10° or less |
| Comparative Example 2 | 9 | Settling developed | Cracks developed | 70 (poor) | 3B or softer | Film disappeared (poor) | 5° or less |

Test Methods

Storage Stability:
 Examination was made on changes in viscosity, settling properties, etc. after storage under the conditions of 100 hours at 50° C. in comparison with the initial condition.

Film Appearance:
 Film appearance, for example, smoothness, transparency, film-forming properties such as development of cracks, etc. was examined.

Adhesion Properties:
 In accordance with JIS K-5400 8.5.2. (1990) Squares-Tape Adhesion Properties Test Method, 100 squares of 1 mm×1 mm were made, followed by adhering an adhesive cellophane tape onto the squares, and peeling the tape to examine a number of squares remaining without being peeled off.

Pencil Hardness:
 A pencil scratching test in accordance with JIS K-5400 8.4.2. (1990) was carried out, and evaluation was made based on resulting mars.

Water Resistance:
 A test panel was dipped into water at 20° C. for 7 days, followed by visually evaluating film appearance.

Wettability or Contact Angle to Water:
 A contact angle to water on the surface of the coating film was measured. An irradiation from a 4 KW high pressure mercury lamp was made at a distance of 30 cm from the surface of the coating film for 10 minutes, followed by measuring a contact angle to water. The contact angle to water was measured in such a manner that a deionized water drop of 0.03 ml was formed on the test panel at 20° C., followed by measuring the contact angle to water by use of a DCCA type Contactangle meter marketed by Kyowa Chemical Co., Ltd.

Example 8 and Comparative Example 3

The inorganic film-forming coating composition of Preparation Example 1 and the dispersion of Preparation Example 9 were coated onto a glass plate by a bar coater so as to be a dry film thickness of 1.0 µm, followed by heat curing at 200° C. for 30 minutes to obtain a coating test panel respectively. On the other hand, a closed testing room equipped with a 4 KW high pressure mercury lamp was filled with acetoaldehyde. The coating test panel was placed at a distance of about 30 cm from the mercury lamp, followed by measuring an acetoaldehyde amount decreased 1 hour after and 3 hours after in the testing room to show gas decomposition properties. An initial acetoaldehyde amount in the testing room was 0.1 g. Results are shown in Table 2.

TABLE 2

| | Preparation Examples | 1 hour after | 3 hours after |
|---|---|---|---|
| Example 8 | 1 | 100 ppm (good) | 200 ppm (good) |
| Comparative Example 3 | 9 | 20 ppm (poor) | 35 ppm (poor) |

Example 9 and Comparative Example 4

The inorganic film-forming coating composition of Preparation Example 2 and the dispersion of Preparation Example 8 were coated onto a glass plate by a bar coater so as to be a dry film thickness of 1 µm, followed by heat curing at 200° C. for 30 minutes to obtain a coating test panel respectively. The coating test panel was exposed outdoors for 6 months, followed by visually evaluating pollution resistance on the surface of the coating film. Results are shown in Table 3.

TABLE 3

| | Preparation Examples | Pollution resistance | Adhesion properties |
|---|---|---|---|
| Example 9 | 2 | (good) | 100 (good) |
| Comparative Example 4 | 8 | Pollution developed (poor) | 100 (good) |

Example 10 and Comparative Example 5
(Energy Transformation Properties 1)

The inorganic film-forming coating composition of Preparation Example 6 and the dispersion of Preparation Example 9 were coated onto a fluorine-doped tin oxide conductive glass plate by an applicator so as to be a dry film thickness of 8 µm, followed by heat curing at 500° C. for 30 minutes to obtain a titanium oxide film electric pole, adsorping a ruthenium complex represented by Ru (11) (bipyridine dicarboxylic acid)-2-(isothiocyanate) as a sensitizing dye to obtain a titanium oxide, film electric pole sensitized with the dye, laminating the electric pole onto an opposite pole transparent conductive glass, introducing an electrolyte comprising an oxidation-reduction system of iodine ion, sealing the sides with a resin, mounting a lead to obtain a photoelectric transducer, and irradiating by use of Solax (trade name, marketed by Seric Ltd., artificial sunlight lamp (100W)) at an irradiation dose of 100 mV/cm$^2$ to evaluate a shortcircuiting current. Results are shown in Table 4.

TABLE 4

| Preparation Examples | Shortcircuiting current (mA/cm²) |
|---|---|---|
| Example 10 | 6 | 1 |
| Comparative Example 5 | 9 | 0.1 |

Example 11 and Comparative Example 6
(Energy Transformation Properties 2)

Eorine Y as a sensitizing dye was adsorbed onto the titanium oxide film electric pole of Example 10 and Comparative Example 5 to obtain a titanium oxide film electric pole sensitized with the dye respectively, followed by evaluating a shortcircuiting current in the same manner as in Example 10 and Comparative Example 5. Results are shown in Table 5.

TABLE 5

| Preparation Examples | Shortcircuiting current (mA/cm²) |
|---|---|---|
| Example 11 | 6 | 1 |
| Comparative Example 6 | 9 | 0.1 |

Example 12 and Comparative Example 7
(Corrosion Resistance)

The inorganic film-forming coating composition of Preparation Example 3 and the viscous liquid of Preparation Example 8 were coated onto a mild steel sheet by a bar coater so as to be a dry film thickness of 0.5 µm, followed by heat curing at 250° C. for 20 seconds to obtain a coating test panel respectively. The coating test panels were subjected to corrosion resistance test (SSTJIS) so as to be dipped into a 1% salt solution at room temperature for 100 hours, and were subjected to adhesion properties test in the same test method as above described. Results are shown in Table 6.

TABLE 6

| | Preparation Examples | Pollution resistance | Adhesion Properties |
|---|---|---|---|
| Example 12 | 3 | No rust developed (good) | 100 (good) |
| Comparative Example 7 | 8 | Local rust developed (poor) | 95 (poor) |

Effect of the Invention:

The inorganic film-forming coating composition of the present invention is a high purity chelate solution free of byproducts such as an alkali salt, fluoride and the like as in the prior art, and shows good storage stability and is capable of forming a titanium oxide film showing good film performances.

The inorganic film-forming coating composition of the present invention can be prepared without including complicated steps such as a step of treating byproducts and the like as in the prior art.

The titanium oxide film formed from the inorganic film-forming coating composition prepared by adding the basic compound (B) to the above titanium-containing water based solution can be applicable to various kinds of fields by taking advantage of photocatalytic activity, energy transformation properties, anticorrosive film properties, heat resistant film properties, gas barrier properties and the like.

Industrial Applicability

The titanium oxide film formed by use of the coating composition in the present invention can be applicable, for example, in the fields of the decomposition and removal of environmental pollutants in air and water by taking advantage of good properties in photoactivity, hydrophilization treatment, antibacterial treatment, deodorizing treatment, hazeproof treatment, water treatment, energy transformation treatment, and the like.

The titanium oxide film formed by use of the coating composition in the present invention also can be applicable to a heat-resistant coating film and corrosion-resistant coating film taking advantages of good properties in heat resistance and corrosion resistance.

What is claimed is:

1. An inorganic film-forming coating composition prepared by adding a basic compound (B) to a titanium-containing water based solution (A) obtained by reacting a hydrogen peroxide water with at least one titanium compound selected from the group consisting of a hydrolizable titanium compound, a low condensation product of the hydrolizable titanium compound, titanium hydroxide and a low condensation product of the titanium hydroxide.

2. A coating composition as claimed in claim 1, wherein the water based solution (A) is obtained by adding the titanium compound to the hydrogen peroxide water.

3. A coating composition as claimed in claim 1, wherein the hydrolizable titanium compound is a titanium monomer containing a group hydrolyzed to form hydroxyl group.

4. A coating composition as claimed in claim 3, wherein the hydrolizable titanium compound is represented by the general formula: Ti(OR)$_4$, wherein R is same or different, and an alkyl group having 1 to 5 carbon atoms.

5. A coating composition as claimed in claim 1, wherein the low condensation product of the hydrolizable titanium compound is a low condensation product of a titanium monomer containing a group hydrolyzed to form hydroxyl group.

6. A coating composition as claimed in claim 5, wherein the low condensation product has a degree of condensation of 2 to 30.

7. A coating composition as claimed in claim 1, wherein the hydrolizable titanium compound is represented by the general formula: Ti(OR)$_4$, wherein R is same or different, and an alkyl group having 1 to 5 carbon atoms.

8. A coating composition as claimed in claim 1, wherein the low condensation product has a degree of condensation of 2 to 30.

9. A coating composition as claimed in claim 1, wherein a mixing ratio of the titanium compound to the hydrogen peroxide water is such that the hydrogen peroxide is in the range of 0.1 to 100 parts by weight per 10 parts by weight of the titanium compound.

10. A coating composition as claimed in claim 1, wherein the basic compound (B) has a boiling point of 300° C. or lower.

11. A coating composition as claimed in claim 1, wherein the basic compound (B) is in the range of 0.001 to 10 parts by weight per 100 parts by weight as the solid content of the water based solution (A).

12. A coating composition as claimed in claim 11, wherein the inorganic film-forming coating composition is a water based solution having a pH of 2 to 10.

13. A coating composition as claimed in claim 1, wherein the inorganic film-forming coating composition is a water based solution having a pH of 2 to 10.

14. A coating composition as claimed in claim 1, wherein the coating composition further contains a water based organic high-molecular compound (C).

15. An inorganic film-forming method which comprises coating the above coating compositions as claimed in claim 1 onto a substrate, respectively, followed by optionally heat treating to form an inorganic film.

16. A method as claimed in claim 15, wherein a sensitizing dye is coated onto the surface of the inorganic film.

17. An inorganic film-forming coating composition prepared by adding a basic compound (B) to a titanium-containing water based solution ($A_1$) obtained by reacting a hydrogen peroxide water in the presence of a titanium oxide sol with at least one titanium compound selected from the group consisting of a hydrolizable titanium compound and a low condensation product of the hydrolizable titanium compound.

18. A coating composition as claimed in claim 17, wherein the water based solution ($A_1$) is obtained by adding the titanium compound to the hydrogen peroxide water.

19. A coating composition as claimed in claim 18, wherein hydrolizable titanium compound is a titanium monomer containing a group hydrolyzed to form hydroxyl group.

20. A coating composition as claimed in claim 18, wherein the low condensation product of the hydrolizable titanium compound is a low condensation product of a titanium monomer containing a group hydrolyzed to from hydroxyl group.

21. A coating composition as claimed in claim 18, wherein a mixing ratio of the titanium compound to the hydrogen peroxide water is such that the hydrogen peroxide is in the range of 0.1 to 100 parts by weight per 10 parts by weight of the titanium compound.

22. A coating composition as claimed claim 17, wherein the hydrolizable titanium compound is a titanium monomer containing a group hydrolyzed to form hydroxyl group.

23. A coating composition as claimed in claim 17, wherein the low condensation product of the hydrolizable titanium compound is a low condensation product of a titanium monomer containing a group hydrolyzed to from hydroxyl group.

24. A coating composition as claimed in claim 17, wherein the hydrolizable titanium compound is represented by the general formula: $Ti(OR)_4$, wherein R is same or different, and an alkyl group having 1 to 5 carbon atoms.

25. A coating composition as claimed in the claim 17, wherein the low condensation product has a degree of condensation of 2 to 30.

26. A coating composition as claimed in claim 17, wherein a mixing ratio of the titanium compound to the hydrogen peroxide water is such that the hydrogen peroxide is in the range of 0.1 to 100 parts by weight per 10 parts by weight of the titanium compound.

27. A coating composition as claimed in claim 17, wherein the basic compound (B) has a boiling point of 300° C. or lower.

28. A coating composition as claimed in claim 17, wherein the basic compound (B) is in the range of 0.001 to 10 parts by weight per 100 parts by weight as the solid content of the water based solution ($A_1$).

29. A coating composition as claimed claim 17, wherein the inorganic film-forming coating composition is a water based solution having a pH of 2 to 10.

30. A coating composition as claimed in claim 17, wherein the coating composition further contains a water based organic high-molecular compound (C).

31. An inorganic film-forming method which comprises coating the above coating compositions as claimed in claim 17, onto a substrate, respectively, followed by optionally heat treating to form an inorganic film.

32. An inorganic film-forming method which comprises coating the above coating compositions as claimed in claim 17, onto a substrate, respectively, followed by optionally heat treating to form an inorganic film.

* * * * *